United States Patent
Balachandran et al.

(10) Patent No.: US 11,914,208 B2
(45) Date of Patent: Feb. 27, 2024

(54) RAPID OPTICAL FIBER LINK RESTORATION SOLUTION

(71) Applicant: Sterlite Technologies Limited, Gurgaon (IN)

(72) Inventors: Binod Balachandran, Gurgaon (IN); Sudipta Bhaumik, Gurgaon (IN); Ajayakumar Gopi, Gurgaon (IN)

(73) Assignee: Sterlite Technologies Limited, Harayana (IN)

( * ) Notice: Subject to any disclaimer, the term of this patent is extended or adjusted under 35 U.S.C. 154(b) by 0 days.

(21) Appl. No.: 17/485,457

(22) Filed: Sep. 26, 2021

(65) Prior Publication Data
US 2022/0317404 A1 Oct. 6, 2022

(51) Int. Cl.
*G02B 6/44* (2006.01)
*G02B 6/46* (2006.01)

(52) U.S. Cl.
CPC .............. *G02B 6/4471* (2013.01); *G02B 6/46* (2013.01); *G02B 6/564* (2023.05); *G02B 6/566* (2023.05); *G02B 6/44384* (2023.05)

(58) Field of Classification Search
None
See application file for complete search history.

(56) References Cited

U.S. PATENT DOCUMENTS

| | | | | |
|---|---|---|---|---|
| 5,230,034 | A * | 7/1993 | Bottoms, Jr. | G02B 6/44384 385/100 |
| 5,480,203 | A * | 1/1996 | Favalora | H02G 1/081 24/115 N |
| 5,649,042 | A * | 7/1997 | Saito | G02B 6/443 385/102 |
| 5,863,083 | A * | 1/1999 | Giebel | G02B 6/4465 385/136 |
| 6,396,993 | B1 * | 5/2002 | Giebel | G02B 6/3807 385/139 |
| 6,398,422 | B1 * | 6/2002 | Szilagyi | G02B 6/545 439/135 |
| 2009/0060421 | A1 * | 3/2009 | Parikh | G02B 6/4444 385/71 |
| 2019/0064469 | A1 * | 2/2019 | Kumar | G02B 6/4494 |
| 2019/0113701 | A1 * | 4/2019 | Murthy | G02B 6/4438 |

* cited by examiner

*Primary Examiner* — Jerry Rahll
(74) *Attorney, Agent, or Firm* — Steven R. Fairchild; Arun Narasani

(57) ABSTRACT

The present invention relates to a rapid optical fiber link restoration solution rapidly deployed by pulling, blowing, jetting or hanging in an aerial, on-ground, underground or inside a duct includes an optical fiber connector and an optical fiber cable. The optical fiber connector is connected at both ends of the optical fiber cable. Particularly, the optical fiber cable is dielectric and has a tensile strength 2500 N and a crush resistance of 2000 N/100 mm. Moreover, the optical fiber connector has water resistance for 1.5 meters of water-head for a maximum period of 30 minutes.

19 Claims, 5 Drawing Sheets

RAPID OPTICAL FIBER LINK RESTORATION SOLUTION

CROSS-REFERENCE TO RELATED APPLICATIONS

This application claims the benefit of Indian Application No. 202111014502 titled "Rapid Optical Fiber Link Restoration Solution" filed by the applicant on 30 Mar. 2021, which is incorporated herein by reference in its entirety.

FIELD OF THE INVENTION

Embodiments of the present invention relate to the field of optical communication networks. And more particularly, relates to a rapid optical fiber link restoration solution.

DESCRIPTION OF THE RELATED ART

An optical fiber network finds its presence in every region across the globe. The optical fiber network supports worldwide communication systems and ensures uninterrupted services related to voice calls, internet and the like. Optical fiber cables are the foundation for the optical fiber networks and link one optical fiber network to another optical fiber network. The optical fiber cables comprise optical transmission elements, i.e., optical fibers, that are responsible for linking the optical fiber networks. However, oftentimes the optical fiber cables get damaged or cut leading to disruption of optical fiber links. The damage may be instilled by a human activity or by a natural disaster. Repair work takes time and increases downtime of the optical fiber network.

In remote regions, the magnitude of the repair work is very large and complex. Measures can be taken to resume the optical fiber links, like a replacement optical fiber cable may be installed to establish the optical fiber link to restore and resume the optical fiber network temporarily and reduce the downtime. Today, optical fiber networks are ubiquitous and have become an important part of our life for digital data transfer. The loss of connectivity may also lead to catastrophic situations e.g. in airports, railway and defence operations, therefore, a quick restoration of the optical connectivity link is necessary as a longer downtime may lead to delay in data transfer in the affected area.

A conventional optical fiber cable requires on-field splicing of the optical fibers which is a time consuming process and can delay the connectivity restoration. Further, the replacement solution needs to withstand harsh environment conditions like sub-zero temperature, rain, flooding, debris etc. as a damaged site can be present anywhere or in any type of terrain and/or the conditions may not be favourable for a desired cable deployment path. A conventional unitube optical fiber cable with metallic armouring is used for underground, on-ground, duct applications only and a conventional unitube optical fiber cable with dielectric armouring is used for aerial (up to 10 m), underground with duct applications only. During the optical connectivity restoration during a disaster or an emergency situation such as earthquake, flood, cyclone, etc., a favourable cable deployment path may not be available, therefore, there exists a need for an optical fiber cable which can be deployed via any possible route e.g. underground, on-ground, aerial (more than 10 m) and duct applications without worrying about compatibility of the optical fiber cable. Further, all the conventional dielectric optical fiber cables are not suitable to be used for outdoor connectivity recovery applications as they do not possess sufficient mechanical strength e.g. tensile strength and crush resistance to facilitate hanging of the optical fiber cable (more than 10 m) and to bear compression load e.g. passing of a small vehicle or accumulation of debris above the optical fiber cable. Also, design of the replacement optical fiber cable should be compatible with different installation techniques like aerial installation, blowing, jetting and pulling. Apart from the optical fiber cable with above desired characteristics, connectors should also have applicability in various environments. During an emergency or disaster situation, rapid connectivity resumption is of utmost priority, therefore, a solution is needed that is robust, versatile and helps to restore connectivity in minimum possible time.

The US Patent Application "US2008273845A1" discloses an optical fiber drop cable that is suitable for both indoor and outdoor applications. It talks about pre-connectorized cable ends for rapid installation.

Similarly, another Japanese Patent Application "JPH0616905U" teaches an optical fiber cable having connectorized ends that may be used for emergency solution for restoring damaged networks.

However, the above mentioned conventional solutions do not provide a damaged optical network restoration solution that is robust for deployment in versatile and harsh conditions.

In light of the above-stated discussion and prior art references, there exists a need to develop an optical fiber cable that can be used as a replacement cable. Hence, the present invention focuses on a rapid optical fiber link restoration and offers deployment in any available conditions and routes.

Any references to methods, apparatus or documents of the prior art are not to be taken as constituting any evidence or admission that they formed, or form part of the common general knowledge.

SUMMARY OF THE INVENTION

Embodiments of the present disclosure provide An embodiment of the present invention relates to a rapid optical fiber link restoration solution allowing restoration of an optical fiber link without on-field splicing. The rapid optical fiber link restoration solution includes an optical fiber cable with a plurality of optical transmission elements. And, the optical fiber cable is pre-connectorized by an optical fiber connector. In particular, the optical fiber cable is dielectric optical fiber cable thereby deploying the optical fiber cable by pulling, blowing, jetting or hanging, and deployable in aerial, on-ground, underground or inside a duct.

In accordance with an embodiment of the present invention, the optical fiber cable has a crush resistance of at least 2000 N/100 mm.

In accordance with an embodiment of the present invention, the optical fiber connector is water resistant for 1.5 meters of water-head for a maximum period of 30 minutes.

In accordance with an embodiment of the present invention, the optical fiber cable has a tensile strength of at least 2500 N.

In accordance with an embodiment of the present invention, a plurality of optical fiber cables is joined using pre-connectorized male-female combinations of multi-fiber connectors 102.

In accordance with an embodiment of the present invention, end points are terminated with pre-connectorized single-fiber connectors to connect with fiber management systems.

In accordance with an embodiment of the present invention, the optical fiber cable further comprises sheath, dielectric armouring, tube, optical fiber ribbons, a plurality of optical fibers, a water blocking gel, rip cords.

In accordance with an embodiment of the present invention, the tube 104c is made up of PBT (polybutylene terephthalate), polypropylene (PP), polyamide, thermoplastic material or a combination of any suitable material.

In accordance with an embodiment of the present invention, the dielectric armouring surrounds a core of the optical fiber cable.

In accordance with an embodiment of the present invention, the dielectric armouring has a diameter in a range of 1 mm to 1.2 mm.

In accordance with an embodiment of the present invention, the dielectric armouring of the optical fiber cable comprises a plurality of strength members.

In accordance with an embodiment of the present invention, the plurality of strength members are made from FRP (Fiber Reinforced Plastic) or ARP (Aramid Reinforced Plastic).

In accordance with an embodiment of the present invention, the plurality of strength members has at least 90% space occupancy around the unitube of the optical fiber cable.

In accordance with an embodiment of the present invention, the plurality of strength members is coated with EAA (Ethylene Acrylic Acid) or EVA (Ethylene-Vinyl Acetate).

In accordance with an embodiment of the present invention, the optical fiber cable has one of a water blocking gel, water swellable yarns and a water ingression prevention material providing a water ingression resistance.

In accordance with an embodiment of the present invention, the water ingression resistance is provided for 3 meters samples of the optical fiber cable for up to 24 hours in a 2 meters water-head.

In accordance with an embodiment of the present invention, an operating service environment of pre-connectorized connectors may be anyone of an indoor controlled environment, an outdoor aerial environment, an outdoor ground level environment, an outdoor subterranean or a subsurface environment.

In accordance with an embodiment of the present invention, the single-fiber connectors form a plurality of fan-out connectors.

In accordance with an embodiment of the present invention, the plurality of fan-out connectors may be a lucent connector (LC) and/or a snap-in connector (SC).

In accordance with an embodiment of the present invention, the plurality of optical transmission elements includes a plurality of optical fibers, a group of loose optical fibers, a group of optical fiber ribbons or a stack of optical fiber ribbons, a group of bendable ribbons, a group of corrugated ribbons, a group of intermittently bonded optical fiber ribbons.

In accordance with an embodiment of the present invention, the rapid optical fiber link restoration solution restores an optical fiber network (or optical network) in case of failure or damage of an optical fiber link in the optical fiber network.

In accordance with an aspect of the present invention, the rapid optical fiber link restoration solution provides a robust and versatile deployable solution specially for disaster affected situations or emergency situations.

In accordance with another aspect of the present invention, the rapid optical fiber link restoration solution provides a pre-connectorized replacement cable solution with dielectric capabilities, water resistance and has high tensile and crush resistance for use in harsh environments.

According to the foregoing solutions, the rapid optical fiber link restoration solution is provided.

These and other aspects herein will be better appreciated and understood when considered in conjunction with the following description and the accompanying drawings. It should be understood, however, that the following descriptions are given by way of illustration and not of limitation. Many changes and modifications may be made within the scope of the invention herein without departing from the spirit thereof.

BRIEF DESCRIPTION OF THE DRAWINGS

So that the manner in which the above recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

ELEMENT LIST

Figure 1:
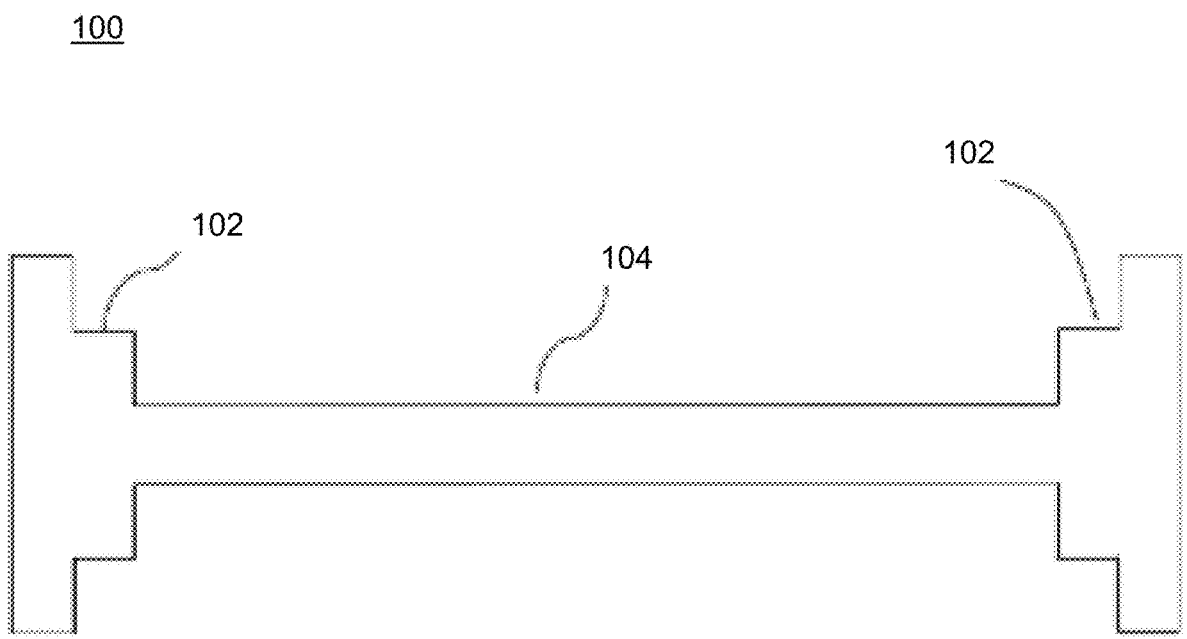
FIG. 1 illustrates a rapid optical fiber link restoration solution comprising an optical fiber cable with a multi-fiber connector pre-installed at both ends of the optical fiber cable in accordance with one embodiment of the present invention.

Rapid Optical Fiber Link Restoration Solution 100
Optical Fiber Connectors 102
Optical Fiber Cable 104
Single-fiber Connectors 106
Sheath 104a
Dielectric Armouring 104b
Tube 104c
Optical Fiber Ribbons 104d
Optical Fibers 104e
Water Blocking Gel 104f
Rip Cords 104g The method and system are illustrated in the accompanying drawings, throughout which like reference letters indicate corresponding parts in the various figures.

It should be noted that the accompanying figure is intended to present illustrations of exemplary embodiments of the present disclosure. This figure is not intended to limit the scope of the present disclosure. It should also be noted that the accompanying figure is not necessarily drawn to scale.

DETAILED DESCRIPTION OF THE INVENTION

The principles of the present invention and their advantages are best understood by referring to FIG. 1 to FIG. 5. In the following detailed description numerous specific details are set forth in order to provide a thorough understanding of the embodiment of invention as illustrative or exemplary embodiments of the disclosure, specific embodiments in which the disclosure may be practiced are described in sufficient detail to enable those skilled in the art to practice the disclosed embodiments. However, it will be obvious to a person skilled in the art that the embodiments of the invention may be practiced with or without these specific details. In other instances, well known methods, procedures and components have not been described in detail so as not to unnecessarily obscure aspects of the embodiments of the invention.

The following detailed description is, therefore, not to be taken in a limiting sense, and the scope of the present disclosure is defined by the appended claims and equivalents thereof. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present disclosure.

Although the terms first, second, etc. may be used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The following brief definition of terms shall apply throughout the present invention:

An optical fiber refers to a medium associated with transmission of information over long distances in the form of light pulses. The optical fiber uses light to transmit voice and data communications over long distances when encapsulated in a jacket/sheath.

The ITU-T, stands for International Telecommunication Union-Telecommunication Standardization Sector, is one of the three sectors of the ITU. The ITU is the United Nations specialized agency in the field of telecommunications and is responsible for studying technical, operating and tariff questions and issuing recommendations on them with a view to standardizing telecommunications on a worldwide basis.

FIG. 1 illustrates a rapid optical fiber link restoration solution comprising an optical fiber cable with a multi-fiber connector pre-installed at both ends of the optical fiber cable in accordance with one embodiment of the present invention. In particular, the rapid optical fiber link restoration solution 100 comprising an optical fiber cable 104 and optical fiber connectors 102 pre-installed at both ends of the optical fiber cable. Moreover, the optical fiber connectors 102 installed at both ends (end-points) of the optical fiber cable are plug and play connectors, enabling the rapid optical fiber link restoration solution 100 to easily and rapidly connect two points in an optical network without the need of on-field splicing.

In an exemplary example, the optical fiber connectors are multi-fiber connectors. Particularly, the multi-fiber connectors are primary multiple fiber connectors for high-speed telecom and data communications networks. Multiple pieces/segments of the optical fiber cable can be rapidly connected through the multi-fiber connectors to obtain a desired length. Moreover, the multi-fiber connectors may be male connectors or a female connectors.

In accordance with an embodiment of the present invention, the optical fiber connectors 102 are water resistant having resistance for 1.5 meters of water-head for a maximum of 30 minutes. Further, the optical fiber connectors 102 may have IP68 rating for water/dust proofing. Advantageously, the pre-connectorized ends can be used as plug-and-play devices for rapid connection, whereby the pre-connectorized optical fiber cable only needs to be connected in order to be configured to work perfectly. Thus, the installation of the rapid optical fiber link restoration solution 100 requires no on-field splicing.

Figure 2:
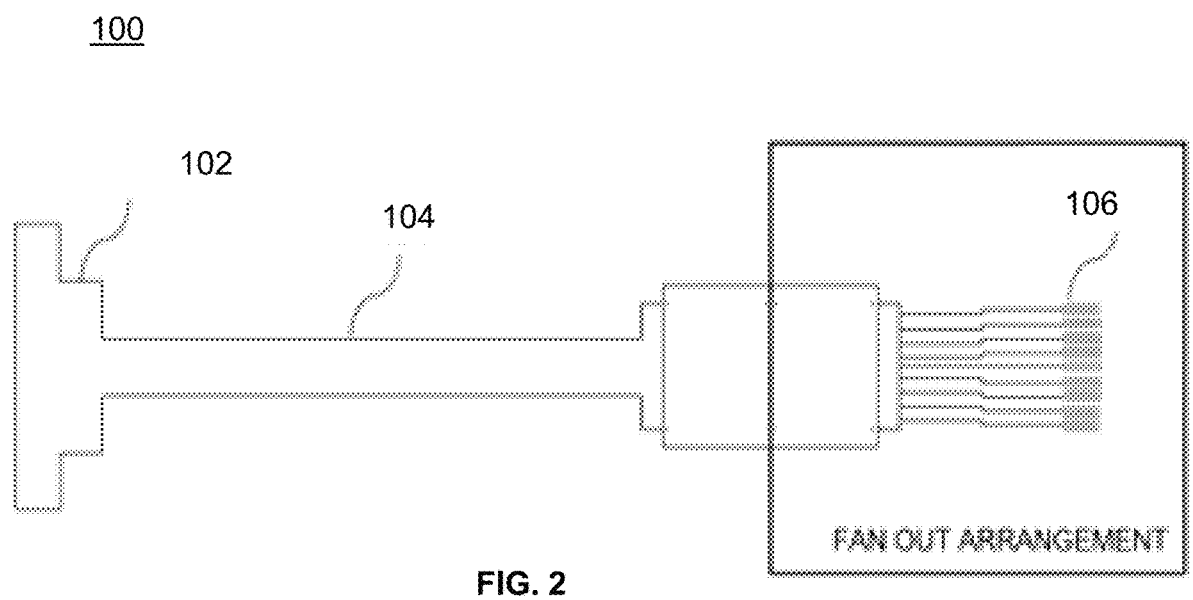
FIG. 2 illustrates the rapid optical fiber link restoration solution comprising a multi-fiber connector pre-installed at one end and a single-fiber connector arrangement at another end of the optical fiber cable in accordance with one embodiment of the present invention.

FIG. 2 illustrates the rapid optical fiber link restoration solution comprising a multi-fiber connector pre-installed at one end and a single-fiber connector arrangement at another end of the optical fiber cable in accordance with one embodiment of the present invention. Particularly, the rapid optical fiber link restoration solution 100 comprising the optical fiber cable 104 with the multi-fiber connector 102 connected at one end of the optical fiber cable 104 and a plurality of single-fiber connectors 106 at another end of the optical fiber cable 104. That is, the end-points of the optical fiber cable 104 are terminated with the pre-connectorized single-fiber connectors 106 to connect with fiber management systems.

In accordance with an embodiment of the present invention, the optical fiber connectors of FIG. 2 include similar features (water resistance) as the optical fiber connectors of FIG. 1.

And, the optical fiber connectors 102 and the plurality of single-fiber connectors 106 may be referred to as a fan-out connector assembly. The plurality of single-fiber connectors 106 may form a fan-out arrangement. Subsequently, the plurality of fan-out connectors 106 may be a lucent connector (LC), a snap-in connector (SC) or any other suitable type and combination of connectors. In general, the LC is a small form factor connector that uses a 1.25 mm ferrule, employs a latch and is easily terminated with any adhesive. The SC is a push-pull connector that utilizes a locking tab.

In accordance with an embodiment of the present invention, the plurality of fan-out connectors enables connection of the rapid optical fiber link restoration solution 100 into fiber management systems/devices and each optical fiber is singularly fanned-out or connectorized.

Figure 3:
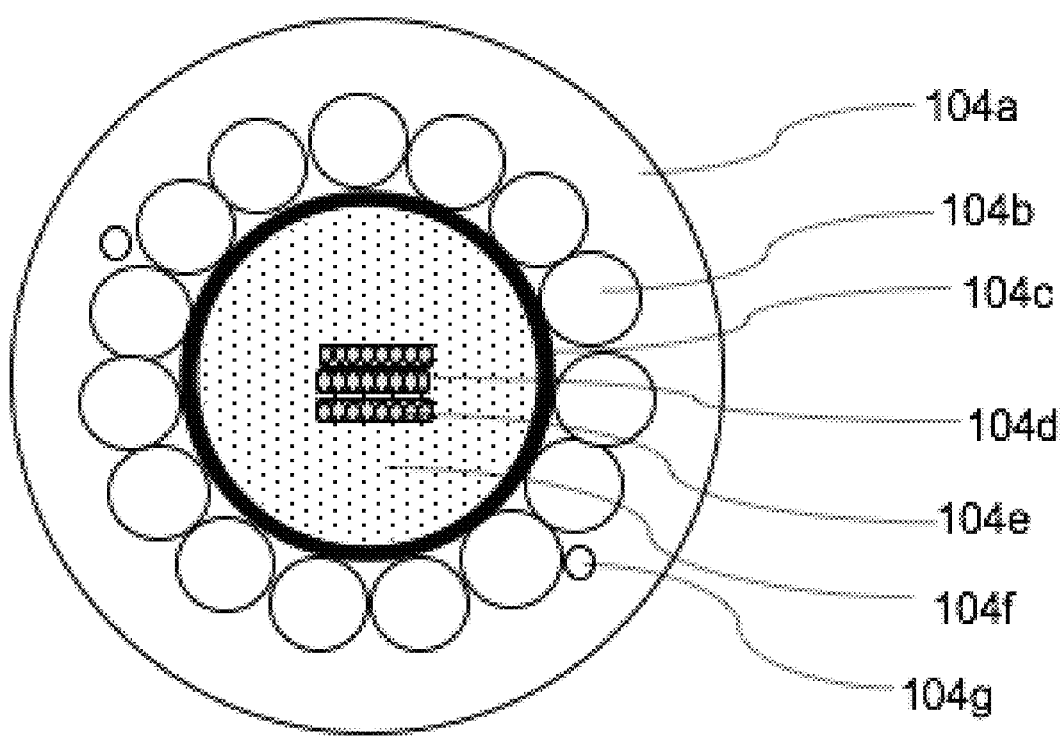
FIG. 3 illustrates a cross sectional view of the optical fiber cable in accordance with an embodiment of the present invention.
Figure 4:
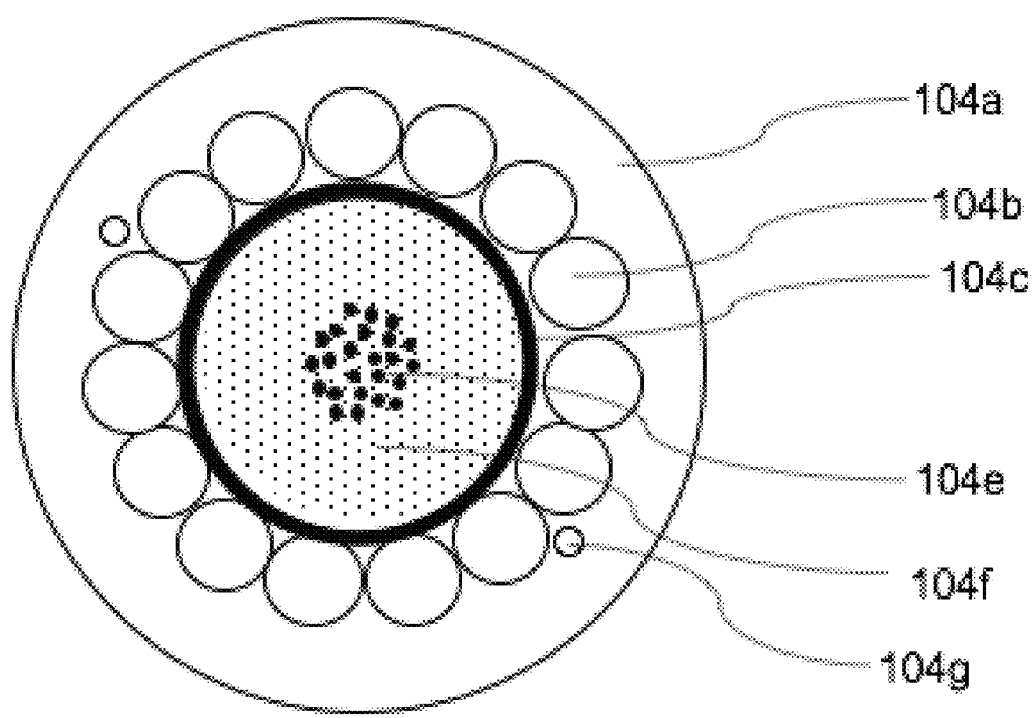
FIG. 4 illustrates a cross sectional view of the optical fiber cable in accordance with one embodiment of the present invention.

FIG. 3 and FIG. 4 illustrate cross sectional views of the optical fiber cable 104 in accordance with one or more embodiments of the present invention In particular, the optical fiber cable 104 may be reusable for different disaster affected optical networks. Moreover, the optical fiber cable 104 comprises a core having a plurality of optical transmission elements 104e encapsulated in a tube 104c. Further, the plurality of optical transmission elements 104e presents in a form of, but not limited to, a plurality of optical fibers, a group of loose optical fibers, a group of optical fiber ribbons or a stack of optical fiber ribbons, a group of bendable ribbons, a group of corrugated ribbons, a group of intermittently bonded optical fiber ribbons.

Particularly, the optical fibers may be single mode optical fibers carrying only a single mode of light to propagate.

In accordance with an embodiment of the present invention, the single mode optical fibers may be bend insensitive fibers. The bend insensitive fibers have less degradation in optical properties during bending of the optical fiber cable. As deployment after a disaster may involve repetitive bending of the optical fiber cable, the bend insensitive fibers help maintain the optical properties of the optical fiber cable. For example, ITU-T G.657.A2, ITU-T G.657.A1 fiber complying to G.652D for an MFD (mode field diameter that is a measure of width of an irradiance distribution, i.e., optical power per unit area, across the end face of a single mode fiber) or any other bend insensitive optical fiber.

Further, the optical fibers may be single-core optical fibers, multicore optical fibers, single-mode optical fibers, multimode optical fibers or the like. The multimode optical fibers carry multiple modes of light to propagate as opposed to the single-mode fibers carrying only one mode of light to propagate. The multicore optical fibers comprise multiple cores as opposed to the single-core optical fibers that comprise only a single core.

In accordance with an embodiment of the present invention, the core of the optical fiber cable comprises a monotube/unitube e.g. a single buffer tube or a loose tube containing optical transmission elements. A buffer tube is used in an optical fiber cable to provide mechanical isolation and protection to the optical transmission elements from physical damages. Further, an optical fiber ribbon bundle is a group of a plurality of optical fiber ribbons arranged together. The optical fiber ribbon includes a number of optical fibers arranged together using a matrix material. Multiple individual optical fiber ribbons are stacked or grouped into a bundle to form the optical fiber ribbon bundle. An intermittently bonded optical fiber ribbon from the group of intermittently bonded optical fiber ribbons is formed by intermittently bonding the plurality of optical fibers with the matrix material that imparts a bending and rolling capability along a width of the intermittently bonded optical fiber ribbon.

Referring to FIG. 3, the optical fiber cable has the core formed by the tube 104c encapsulating the group of optical fiber ribbons 104d having the plurality of optical fibers 104e surrounded by a water blocking gel 104f. Alternatively, the core may include water swellable yarns or a water ingression prevention material such as tape or the like.

Similarly, referring to FIG. 4, the optical fiber cable has the core formed by the tube 104c encapsulating the plurality of loose optical fibers 104e and the water blocking gel 104f. Alternatively, the core may include water swellable yarns or a water ingression prevention material such as tape or the like.

In particular, the water blocking gel or water swellable yarns or water ingression prevention material provides water ingression resistance for 3 m (meter) samples of the optical fiber cable up to 24 hours in a 2 m water-head. The tube 104c may be a loose tube, a unitube, a monotube or the like. The tube 104c is made up of, but not limited to, PBT (polybutylene terephthalate), polypropylene (PP), polyamide, thermoplastic material or a combination of any suitable material. In an example, the tube 104c may comprise up to 144 optical fibers as outdoor optical fiber cables normally contain optical fibers up to 144.

In accordance with an embodiment of the present invention, the core is surrounded by a dielectric armouring (or a dielectric armouring layer) 104b. The dielectric armouring layer may be made from a plurality of strength members. The plurality of strength members may be made of, but not limited to, FRP (Fiber Reinforced Plastic), ARP (Aramid Reinforced Plastic) or any other suitable dielectric/strength material. The plurality of strength members is arranged around the core, wherein each strength member is in contact with the tube (preferably unitube) and the adjacent strength member(s).

The dielectric armouring 104b, i.e., the plurality of strength members, is arranged helically around the tube 104c (i.e., around the core). In particular, the helical arrangement of the plurality of strength members provides an additional length of dielectric armouring (strength layer) as compared to if it was placed longitudinally which helps to reduce stress on the dielectric armouring (strength layer) during bending operations. Moreover, the dielectric armouring enables the optical fiber cable 104 to be used nearby a high voltage cable as armouring of metal wires are prone to lightning strikes and electromagnetic effects from a nearby high voltage line. The dielectric armouring 104b formed by the plurality of strength members may have a round shape, a flat shape or any other suitable shape.

Further, number of strength members to be arranged around the tube 104c is calculated for a round figure of strength members that will occupy at least 90% space when kept in a circumscribing fashion around the tube as below 90% occupancy of the plurality of strength members, there may be a large gap in between the strength members and thus, uniformity of the dielectric armouring may not be achieved.

The plurality of strength members in the dielectric armouring 104b has a diameter in a range of 1 mm (millimetre) to 1.2 mm. The plurality of strength members may have optimized dimensions to meet criteria for the optical fiber cable designed for fiber count up to 144. The plurality of strength members may be coated with EAA (Ethylene Acrylic Acid) or EVA (Ethylene-Vinyl Acetate) coating for better adhesion with a sheath (or jacket) 104a, to enhance the adhesion of the plurality of strength members with the sheath. The plurality of strength members is surrounded by the sheath 104a. The plurality of strength members may be partially or fully embedded in the sheath 104a.

The dielectric armouring 104b formed by the plurality of strength members imparts a high tensile strength to the optical fiber cable. Tensile strength is a measurement of a force required to pull something such as rope, wire, cable or a structural beam to a point where it breaks. Because of the high tensile strength, the optical fiber cable can be used in aerial optical networks and can sustain hanging for a desired span length. In an example, the tensile strength of the optical fiber cable 104 is at least 2500 N that enables the optical fiber cable to be hung for a span length ranging between 30 m to 40 m.

In accordance with an embodiment of the present invention, the high tensile strength allows the optical fiber cable to be hung for sufficient length where conditions are not suitable for laying the optical fiber cable on ground after a disaster. If the tensile strength is below 2500, the optical fiber cable may not be suitable for hanging for the span length of more than 30 m. Further, the high tensile strength makes the optical fiber cable usable for deploying by pulling, blowing/jetting or hanging, the method may be chosen based on the equipment availability and convenience at the time of disaster or an emergency situation. In general, optical fiber cable pulling is a process where optical fiber cable installation is carried out into pre-installed underground ducts/pipes by manual pulling or by a puller machine. The optical fiber cable installation by using a high speed air flow combined with an additional mechanical pushing force is called blowing or jetting.

In accordance with an embodiment of the present invention, the sheath 104a is extruded over the plurality of strength members i.e., the dielectric armouring 104b. Usually, sheathing (extrusion) is done at a high temperature (more than 100° C.). The sheathing is a process of squeezing a sheathing material through a funnel of a die as the core runs through the center. The sheathing material for the sheath may include, but not limited to, polyvinyl chloride, polyethylene (such as High Density Polyethylene (HDPE), Medium Density Polyethylene, and Low Density Polyethylene), polyurethane, thermoplastic rubber/elastomer, thermoplastic chlorinated polyethylene or a combination thereof.

Further, the sheath 104a and the dielectric armouring 104b formed by the plurality of strength members impart high crush resistance to the optical fiber cable. Crush resistance testing involves measurement of a compressive load to a point when a sample such as the optical fiber cable, deforms, fractures, shatters or collapses.

In accordance with an embodiment of the present invention, the optical fiber cable 104 may be laid on-ground, underground or inside a duct. In this scenario, the optical fiber cable must have sufficient crush resistance to withstand the compressive load that may occur due to a movement over it or by any other means that transmits load to the optical fiber cable 104. The optical fiber cable 104 has the crush resistance of at least 2000 N/100 mm and preferably in a range of 2000 N/100 mm to 4000 N/100 mm. This crush resistance is sufficient to withstand passing of pedestrians, small vehicles etc. over a buried or laid optical fiber cable. If the crush resistance is below 2000 N/100 mm, then the optical fiber cable may get physically damaged if a heavy load passes over it. If the crush resistance is above 4000 N/100 mm, the optical fiber cable may get bulky and too stiff to handle.

Further, the sheath 104a has a thickness of at least 1.3 mm to make the optical fiber cable low bend sensitive by reducing the fatigue induced in the optical fiber cable during bending. Below the thickness of 1.3 mm, the sheath may become mechanically weak to withstand surrounding conditions during an emergency situation such as natural disaster and may have poor fatigue performance which may lead to fractures in the optical fiber cable. An optimized thickness above 1.3 mm may be derived for the optical fiber cable depending upon fiber count, dielectric layer and/or core diameter.

In accordance with an embodiment of the present invention, the optical fiber cable 104 may have one or more rip cords 104g for easy stripping of the sheath 104a to easily access the plurality of optical transmission elements. The optical fiber cable can be wound on a drum with a diameter of 40 times an outer diameter of the optical fiber cable. The minimum bend diameter of the cable is 40 times the outer diameter of the optical fiber cable, thereby, the drum diameter is kept as 40 times the outer diameter of the optical fiber cable. The drum diameter of more than 40 times the outer diameter of the optical fiber cable will increase the size of the drum.

Figure 5:
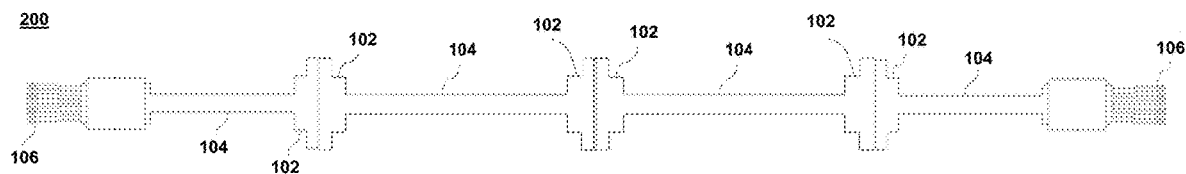
FIG. 5 illustrates an exemplary deployment using underground, on-ground, aerial combinations of optical fiber cables in accordance with one embodiment of the present invention.

FIG. 5 illustrates an exemplary deployment 200 using underground, on-ground, aerial combinations of optical fiber cables (i.e., a plurality of optical fiber cables) e.g., a first intermediate cable segment may be deployed aerially, a second segment may be deployed underground and an end segments may be deployed on-ground. Intermediate cable segments of the optical fiber link are joined using male-female combinations of the multi-fiber connectors 102 to obtain a desired length of the optical link and the end segments are connected using single-fiber connectors 106 to restore the connectivity at the fiber management systems. All the connectors in the optical link 200 are pre-connectorized and have plug-and-play use capability for rapid connectivity without the need of on-field splicing. Further, the replacement optical fiber cable is suitable to withstand environmental conditions like sub-zero temperature, rain, flooding, debris etc. as a damaged site can be present anywhere or in any type of terrain. The plurality of optical fiber cables is connected with the multi-fiber connectors (male-female) 102 forming intermediate links and the plurality of single-fiber connectors 106 at both ends of the plurality of optical fiber cables.

In accordance with an embodiment of the present invention, an operating service environment of pre-connectorized connectors may be indoor controlled environment, outdoor aerial environment, outdoor ground level environment, outdoor subterranean or subsurface environment which makes the optical fiber cable suitable to be deployed in any available condition.

Advantageously, the rapid optical fiber link restoration solution 100 may be rapidly deployable and no on-field splicing is needed. The rapid optical fiber link restoration solution may be deployed in aerial optical networks, on ground optical networks, underground optical networks and in duct optical networks or the like. The rapid optical fiber link restoration solution is dielectric thereby is less prone to lightning strikes and can be installed near high voltage lines. The optical fiber cable and the connector are water resistant. As the optical fiber cable may be deployed aerially, on-ground, underground, it has sufficient water protection from moisture, rain, water on ground or underground. The optical fiber cable has sufficient tensile strength for aerial deployment up to 30 to 40 meters length and crush resistance to bear the load for on-ground, underground deployment. Additionally, the optical fiber cable is compatible with different installation techniques like aerial installation, blowing, jetting and pulling. These features make the provided optical link restoration solution fast, robust and versatile.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

It will be apparent to those skilled in the art that other embodiments of the invention will be apparent to those skilled in the art from consideration of the specification and practice of the invention. While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope of the invention. It is intended that the specification and examples be considered as exemplary, with the true scope of the invention being indicated by the claims.

It is to be understood that the terms so used are interchangeable under appropriate circumstances and embodiments of the invention are capable of operating according to the present invention in other sequences, or in orientations different from the one(s) described or illustrated above.

What is claimed is:

1. An optical fiber link restoration solution allowing restoration of an optical fiber link without on-field splicing comprising:
   an optical fiber cable with a plurality of optical transmission elements, and the optical fiber cable is pre-connectorized by an optical fiber connector at both ends of the optical fiber cable, wherein the optical fiber connectors are plug and play connectors, and wherein the optical fiber cable is dielectric optical fiber cable thereby deploying the optical fiber cable by pulling, blowing, jetting or hanging, and deployable in aerial, on-ground, underground or inside a duct wherein a plurality of optical fiber cables is joined using pre-connectorized male-female combinations of multi-fiber connectors.

2. The optical fiber link restoration solution as claimed in claim 1, wherein the optical fiber cable has a crush resistance of at least 2000 N/100 mm.

3. The optical fiber link restoration solution as claimed in claim 1, wherein the optical fiber connector is a water resistant for 1.5 meters of water-head for a maximum period of 30 minutes.

4. The optical fiber link restoration solution as claimed in claim 1, wherein the optical fiber cable has a tensile strength of at least 2500 N.

5. The optical fiber link restoration solution as claimed in claim 1, wherein the optical fiber cable further comprises sheath, dielectric armouring, tube, optical fiber ribbons, a plurality of optical fibers, a water blocking gel, rip cords.

6. The optical fiber link restoration solution as claimed in claim 5, wherein the tube 104 $c$ is made up of PBT (polybutylene terephthalate), polypropylene (PP), polyamide, thermoplastic material or a combination of any suitable material.

7. The optical fiber link restoration solution as claimed in claim 1, wherein the plurality of optical transmission elements includes a plurality of optical fibers, a group of loose optical fibers, a group of optical fiber ribbons or a stack of optical fiber ribbons, a group of bendable ribbons, a group of corrugated ribbons, a group of intermittently bonded optical fiber ribbons.

8. The optical fiber link restoration solution as claimed in claim 1, wherein the optical fiber cable has one of a water blocking gel, water swellable yarns and a water ingression prevention material providing a water ingression resistance.

9. The optical fiber link restoration solution as claimed in claim 8, wherein the water ingression resistance is provided for 3 meters sample of the optical fiber cable up to 24 hours in a 2 meters water-head.

10. The optical fiber link restoration solution as claimed in claim 1, wherein the optical fiber cable is a unitube optical fiber cable having a dielectric armouring surrounding a core of the optical fiber cable.

11. The optical fiber link restoration solution as claimed in claim 10, wherein the dielectric armouring has a diameter in a range of 1 mm to 1.2 mm.

12. The optical fiber link restoration solution as claimed in claim 10, wherein the dielectric armouring of the optical fiber cable comprises a plurality of strength members.

13. The optical fiber link restoration solution as claimed in claim 12, wherein the plurality of strength members are made from FRP (Fiber Reinforced Plastic) or ARP (Aramid Reinforced Plastic).

14. The optical fiber link restoration solution as claimed in claim 12, wherein the plurality of strength members has at least 90% space occupancy around the unitube of the optical fiber cable.

15. The optical fiber link restoration solution as claimed in claim 12, wherein the plurality of strength members is coated with EAA (Ethylene Acrylic Acid) or EVA (Ethylene-Vinyl Acetate).

16. The optical fiber link restoration solution as claimed in claim 1, wherein an operating service environment of pre-connectorized connectors may be anyone of an indoor controlled environment, an outdoor aerial environment, an outdoor ground level environment, an outdoor subterranean or a subsurface environment.

17. The optical fiber link restoration solution as claimed in claim 1, wherein end points are terminated with pre-connectorized single-fiber connectors to connect with fiber management systems.

18. The optical fiber link restoration solution as claimed in claim 17, wherein the single-fiber connectors forms a plurality of fan-out connector.

19. The optical fiber link restoration solution as claimed in claim 18, wherein the plurality of fan-out connectors may be a lucent connector (LC) and/or a snap-in connector (SC).

* * * * *